(12) United States Patent
Romano et al.

(10) Patent No.: US 7,913,901 B2
(45) Date of Patent: Mar. 29, 2011

(54) SPEND DIAGNOSTICS AND LEAD MANAGEMENT

(75) Inventors: Allison M. Romano, New York, NY (US); Dan Cheung Tat Chan, Fanwood, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 699 days.

(21) Appl. No.: 11/634,932

(22) Filed: Dec. 7, 2006

(65) Prior Publication Data

US 2008/0140505 A1 Jun. 12, 2008

(51) Int. Cl.
*G06K 5/00* (2006.01)
*G07D 11/00* (2006.01)
(52) U.S. Cl. ........................................ 235/380; 235/379
(58) Field of Classification Search .................. 235/379, 235/380, 382; 705/14.46, 35, 41, 80
See application file for complete search history.

(56) References Cited

U.S. PATENT DOCUMENTS

| | | | |
|---|---|---|---|
| 2003/0061132 A1* | 3/2003 | Yu et al. ........................... | 705/30 |
| 2005/0279824 A1* | 12/2005 | Anderson et al. ............. | 235/380 |
| 2006/0218087 A1* | 9/2006 | Zimmerman ................... | 705/39 |
| 2007/0168267 A1* | 7/2007 | Zimmerman et al. .......... | 705/35 |

* cited by examiner

*Primary Examiner* — Thien M Le
(74) *Attorney, Agent, or Firm* — Snell & Wilmer L.L.P.

(57) ABSTRACT

A method and system are used to optimize utilization of a transaction card by a card member. The system and method including generating a first data set based on data stored in a database representing industries of the card members. Generating a second data set representing an average amount charged to a transaction account by the card members in each respective one of the industries based on the first data set. Comparing the average amount charged from the first generating step to an actual amount charged by each individual one of the card members in a respective one of the industries. Communicating a result of the comparison to the card members. Receiving data from the card members based on their receiving of the comparison result. Storing the data in the database or a lead management device, such that the data is updated.

13 Claims, 6 Drawing Sheets

SPEND DIAGNOSTICS AND LEAD MANAGEMENT

BACKGROUND

1. Field of the Invention

This invention generally relates to a system and method for developing spend diagnostics for card members and for developing and maintaining a lead management tool for a card member company.

2. Related Art

Card issuer companies increase their revenues when card members increase their spending. Benefits from using the card, e.g., reward points and the like, are one way card issuer companies try to entice card members to increase their spending. However, in a slow economic market, its harder to entice a card member to increase their spending.

Currently, many card issuer companies perform only incoming customer service functions, including receiving of communications from card members. In some instances, data from these communications is compiled and stored in one or more databases or other storage systems. However, the card member companies cannot effectively compile enough data to determine if a card member is using their spending capacity and/or utilizing the benefits of being a card member through only doing data compilation of incoming communications. This is because with such limited data, many of the card issuer companies lack the tools and technology to perform adequate spend diagnostics regarding current card members. The card issuing companies also typically lack any tools that would allow effective and efficient management of their communications with the card members, e.g. historical and/or individual data on each card member. Thus, during communications with the card members, because of the lack of specific information the card issuer companies cannot know if they should or could entice the card members to increase their spending or change their spending habits. Thus, because of the lack of technology or tools, most of the card member companies do not adequately and efficiently communicate with their card members, allowing their card members to remain ignorant of the full utilization of their transaction cards and spend capacity.

Given the foregoing, what is needed is a system and a method for optimizing utilization of a transaction card.

SUMMARY

An embodiment of the present invention is directed to a method and system of optimizing utilization of a transaction card. This includes generating a first data set based on data stored in a database representing industries of card members. Generating a second data set representing an average amount charged to a transaction account by the card members in each respective one of the industries based on the first data set. Comparing the average amount charged from the first generating step to an actual amount charged by each individual one of the card members in a respective one of the industries. Communicating a result of the comparison to the card members. Receiving data from the card members based on their receiving of the comparison result. Storing the received data in the database or a lead management device, such that the database or tool is updated.

Another embodiment of the present invention is directed to lead management of card member information. This includes establishing data files for each respective card member. Propagating demographic information into corresponding ones of the data files. Determining spend diagnostics of each of the card members compared to average benchmarks of related ones of the card members in each industry or revenue category. Propagating results of the spend diagnostics into the data files. Generating contact scheduling entries in the data files. Conducting outgoing and incoming data compilation based on the scheduling entry. Updating the data files based on the previous step. Optionally, these steps can be periodically or continually repeated.

In a further embodiment of the present invention, there is provided a computer program product comprising a computer useable medium having a computer program logic recorded thereon for controlling at least one processor, the computer program logic comprising computer program code devices that perform operations similar to the devices and methods in the above embodiments.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number may identify the drawing in which the reference number first appears. Similar reference numbers may indicate similar elements.

DESCRIPTION

Figure 1:
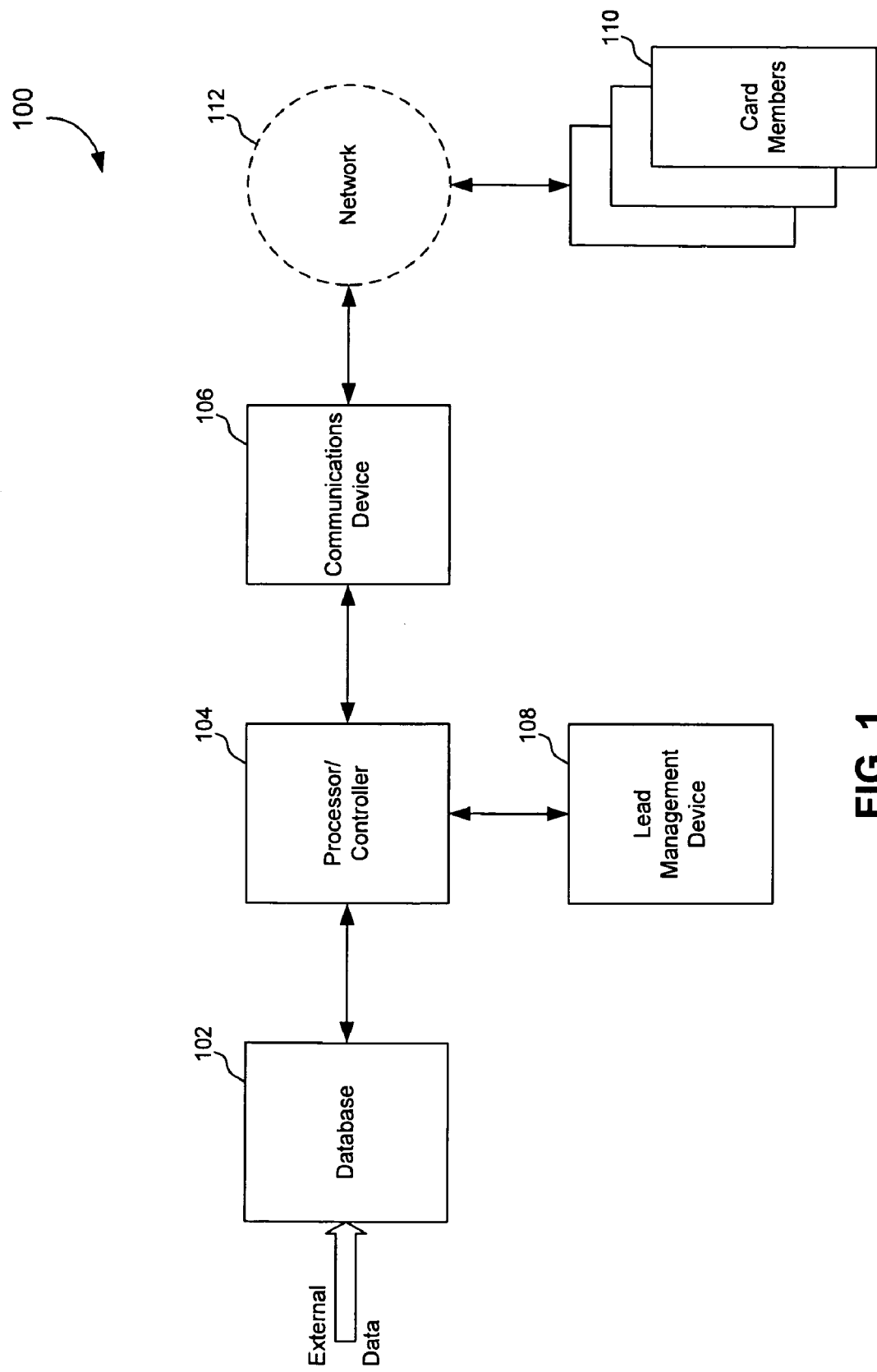
FIG. 1 shows a system.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The term "merchant" as used herein means any person, entity, distributor system, software, and/or hardware that is a provider, broker, and/or any other entity in the distribution chain of goods or services. For example, a merchant may be a credit card issuer, a hotel chain, an airline, a grocery store, a retail store, a travel agency, a service provider, including, but not limited to, a medical service provider, an online merchant, or the like.

A "transaction account" as used herein refers to an account associated with an open account card or a closed account card system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a card that may only be accepted at a clothing retailer, such as a Saks Fifth Avenue® store.

The term "transaction instrument" as used herein may include any type of open or closed charge card, credit card, debit card, FSA card, stored value card, an RFID chip based card or token, and the like. For convenience, a transaction instrument may be referred to as a "card."

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder, and radio frequency card or payment statement).

An "issuer" or "issuing card company" issues transaction instruments, (e.g., credit cards, charge cards, debit cards, etc.). Examples of Issuers may be Bank of America, Citigroup, American Express, Capital One, etc.

Persons skilled in the relevant arts will understand the breadth of the terms used herein and that the exemplary descriptions provided are not intended to be limiting of the generally understood meanings attributed to the foregoing terms.

The following embodiments describe a process of spend diagnostics and lead management according to the present invention.

Referring now to the drawings, FIG. 1 shows a system 100. System 100 includes a database 102, a processor/controller 104 (hereinafter controller), a communications device 106, and a lead management device 108. Database 102, controller 104, communications device 106, and lead management device 108 can be associated with an issuer or card member company, i.e., is remotely or locally coupled to the company's systems. Communications device 106 is coupled to one or more card members 110, possibly via an optional network 112.

Network 112 can be a wired or wireless telecommunications or data network, such as a cellular network, a hard-wired or optical telephone network, a satellite network, an Internet, Intranet, or Extranet network, or other similar networks, as would be apparent to a skilled artisan upon reading and understanding this description. Additionally, or alternatively, network 112 can be a domestic and/or international postal or courier network.

Database 102 can receive information from one or both of external sources and internal sources relating to card member and/or merchant information. For example, database 102 can include information from a purchased commercial database, e.g., Dunn and Bradstreet financial information. Also, database 102 can include information relating to demographic, financial and other information submitted during enrollment of the card members 110, or information that has been collected from the card members 110 via communications device 106 or at other times. Database 102 can further include information relating to merchants that accept the card issuing company's transaction card for transactions. Database 102 can be any one of a variety of different types of databases operating based on a variety of underlying applications. For example, database 102 can be a database associated with MICROSOFT ACCESS® or the like.

Processor/controller 104 can be one or more microprocessors or operating systems with associated applications (software applications), such as one or more computer systems. The functions performed by processor/controller 104 can be performed by hardware, software, firmware, or a combination thereof. For example, controller 104 can filter or process data from database 102 and/or from communications device 106 in order to propagate the data into lead management device 108 or populate fields within lead management device 108, as is discussed in more detail below. This can be done to capture transactional level spend and commercial share of wallet data for targeting criteria and prioritization of card members. The commercial size of spending wallet is the total business spend of a business including cash, but excluding bartered items. The commercial share of wallet is the portion of the spending wallet that is captured by a particular financial company. The commercial share of wallet can be leveraged using various data sources to provide outputs that describe a card member's spend capacity. High spend potential industries and spend categories can be determined, and input into lead management device 108 for optimizing and customizing communications with card members 110.

The controller 104 can be used to process information from database 102 to generate or determine spend information or spend diagnostics relating to card members and merchants. For example, this can be done based on using a standard industry classification (SIC) code, which is issued by the government based on census data. Using this code, information from database 102 can be filtered or processed using controller 104 to determine to which industry each card member should belong, what the average card member in each industry (or revenue category per industry) spends, where they spend it, and/or how they spend it. This information is used to create benchmarks or spend diagnostics. The benchmarks or spend diagnostics can be used to compare an average spend per category versus actual spend for each respective card member to determine additional spend capacity or additional spend opportunity for card members. This can also be done on a percentage basis, to make the information more streamlined and useful. For example, maybe only the top 80% of spending categories per industry are analyzed to eliminate outlier data.

Communications device 106 can be one of several types of devices, such as a computer system, a telephone, a facsimile machine, a handheld device, a system to generate and read direct mail, a transmitter/received system, or the like. In regards to direct mail, an individualized report for each card member can be generated and send out with their bill monthly, quarterly, annually, or any other time period designated by a customer or the card member company. Thus, communications device 106 can be any device that allows for communications (e.g., telephone calls, emails, instant messaging, facsimiles, direct mailings, etc.) between controller/processor 104 and card members 1 10, possibly via network 112. Communication with card members 110 can be used to compile information regarding how card members 110 use or do not use their cards. Then, based on this information, a best opportunity for spend growth can be determined by the card member company for each card member 110. This can be based on using the benchmarks, for example, what the card members 110 spending in the top 80 percentile are doing. This information is then communicated to the card members 110 in that industry who are not currently spending in this amount, spending for this supply, or using these vendors.

Thus, once compiled, the information in lead management device 108 can be used to inform card members 110 how other card members 110 in their industry and/or revenue categories are using their cards. For example, how much and where they are spending, i.e., with what categories of expenses or types of merchants they are doing business. This communication can also be used to show where card members 110 can additionally use their cards to not only increase spending for the card member company, but increase the card members reward points. For example, the card member company can discuss how others in the construction industry (e.g., heavy construction or contractors) or professional industry (e.g., doctors, lawyers, dentists, etc.), possibly in their revenue category, have used their cards to purchase certain types of supplies from certain vendors, such as communicating that other similar card members 110 have used their card for travel, meals, lodging, etc. in this spend amount. For example, almost all card members 110 in the construction industry spend X dollars on this supply from these three vendors.

Additionally, or alternatively, lead (or contact) management device 108 can be any device that allows for storage and/or consolidation of contact demographic, financial, and other information, outgoing contact schedule information, spend diagnostic information, and received card member information from previous contacts, etc. For example, this lead management device 108 can be used to allow for easy tracking and management of pre-communication research conducted either a single time, periodically, or continuously for each card member or sets of card members.

Additionally, or alternatively, lead management device 108 and controller 104 can be used in conjunction to provide a robust contact management tool to: manage communication leads and agent workflow, store critical card member company and industry-specific customer information needed for a successful communication, and generate and export detailed reports. Lead management device 108 can include uploaded lead files that contain essential customer information needed for a successful communication with the customer. This may be based on previous contact with that particular costumer and stored information as to their concerns or questions, which can be investigated. After determining answers, the customer can be contacted to update them, which may lead them to more spending. The information stored in lead management device 108 can include, but is not limited to, vertical identifiers, spend history, and spend segment. The centralized location of this information can reduce the amount of pre-communication research required by each communicating agent. Agents can view and update/change customer information through their graphical user interfaces from many different types of devices, e.g., computers, handheld devices, or the like. Further, lead management device 108 can be simultaneously accessed/updated by a plurality of agents at one time, either locally or remotely. For example, it could be coupled wirelessly to communications device 106. Thus, lead management device 108 can be used to provide a secure location for vertical leads, the ability to capture record of charge (ROC) level data from merchants, prioritize leads using spend diagnostic methodology, automation of lead distribution, store key vertical information by customer, maintain agent workflow, and provide detailed productivity and call outcome reporting.

In one example, through scheduling information propagation or storage, agents can manage their workflow as the lead management device 108 schedules call backs and reminders, allows agents to create detailed records, and view their contact history.

At the administrative level, possibly through controller 104, lead management device 108 can be used to generate robust productivity reporting for agents and provide the data necessary to produce spend reporting of card members 110. Through these schemes discussed above, lead management device 108 can be leveraged to produce increased card member spending brought about through an outbound communications program designed to engage card members in consultative and industry relevant dialogues to educate them on benefits of using their card, based on spend diagnostics.

Thus, lead management device 108 and controller 104 can be used to upload leads, add critical industry information (e.g., benchmarks per industry, revenue category, etc.), create agent portfolios, schedule and remind agents of call backs, as well as generate detailed reporting. This can typically lead to quality customer interactions, e.g., interactions where the agent provides the customer with detailed and customized information that actually allows the customer to gain knowledge and make better informed spending decisions. Providing quality customer interaction can lead to increased spending by card members 110, increased loyalty by card members 110, reduced attrition of card members 110, and an increase in agent satisfaction and efficiency. This is because the information provided educates the card members 110 on how to: get more value out of their relationship with the card member company, increase rewards points earned, and save time through streamlining expense management through making more purchases with their cards.

Figure 2:
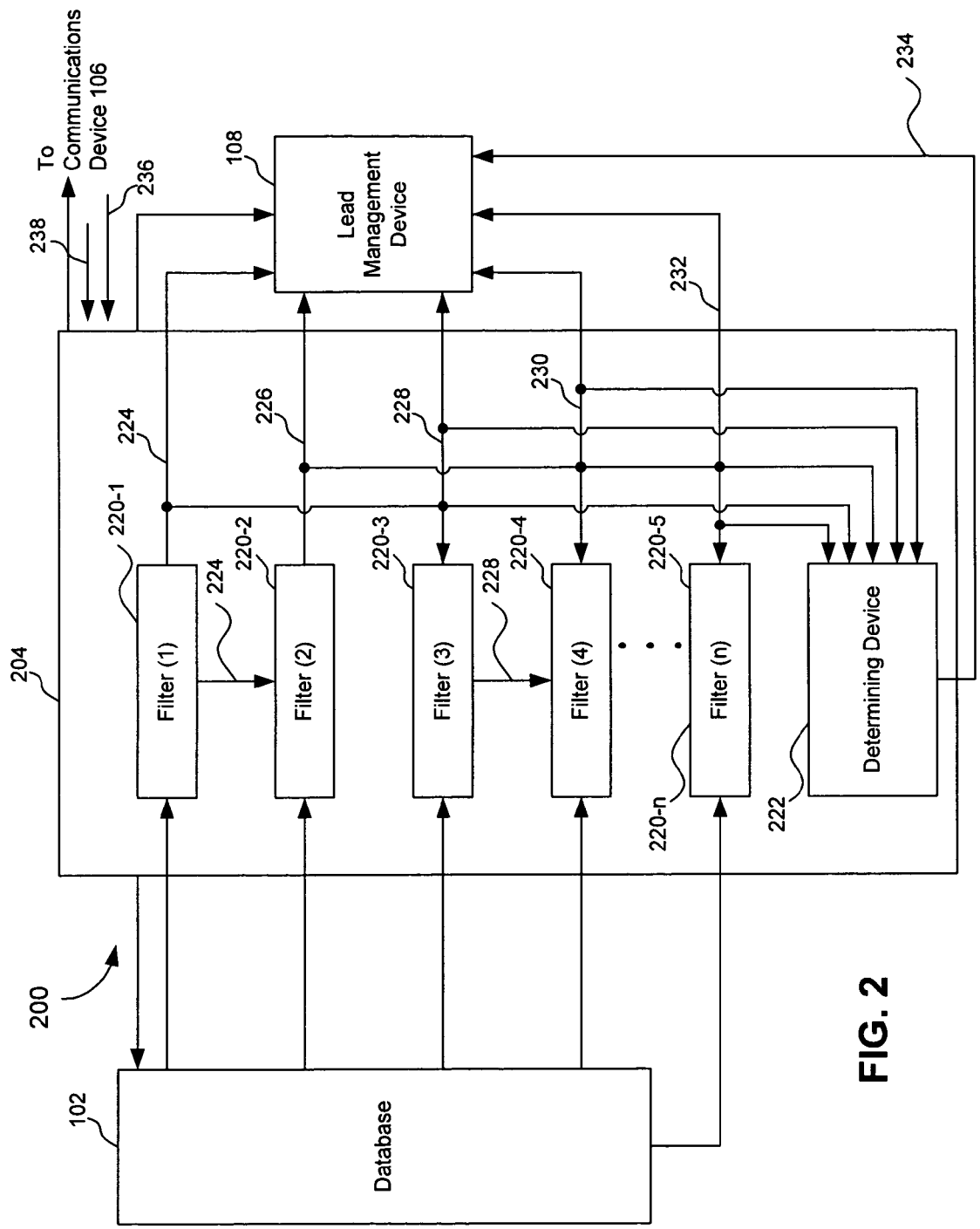
FIG. 2 shows a portion of the system in FIG. 1

FIG. 2 shows a portion 200 of system 100 in FIG. 1. For example, portion 200 includes one or more devices or applications found in a processor/controller 204. In this example, processor/controller 204 includes filters 220, where filters 220-1 to 220-n are shown (n being a positive integer greater than 0), and a determining device 222. Filters 220 can be used to segregate data from data base 102 into different sets or categories. For example, filters 220 can be software modules or hardware devices. As discussed below, portion 200 of system 100 can be used to analyze and update database 102 and/or lead management device 108 to determine and communicate unused spending power for card members 110.

In one exemplary operation, a first filtering device 220-1 is configured to filter data stored in database 102 to determine industries of card members 110, which is used to generate a first data set 224. A second filtering device 220-2 is configured to filter first data set 224, or data from database 102, to determine types of expenses of card members 110 within each of the industries, which is used to generate a second data set 226. A third filtering device 220-3 is configured to filter first data set 224, or data from database 102, to determine a revenue category of card members 110 within each of the industries, which is used to generate a third data set 228. A fourth filtering device 220-4 is configured to filter second data set 226 to determine vendors for each of the types of expenses, which is used to generate a fourth data set 230. A fifth filtering device 220-5 is configured to filter second data set 226 to determine an amount of each of the types of expenses, which is used to generate a fifth data set 232.

Determining device 222 is configured to determine a difference in actual spend amount between each respective one of card members 110 in each respective one of the industries from first data set 224 (additionally or alternatively, in each respective one of the revenue categories from third data set 228) compared to an average spend amount for each of the revenue categories in fifth data set 232 to generate a sixth data set 234.

In the embodiment of FIG. 2, communications device 106 (not shown, see FIG. 1) is configured to (a) communicate sixth data set 234 to card members 110 and receive a seventh data set 236 therefrom and (b) communicate fourth data set 230 to card members 110 and receive an eighth data set 238 therefrom. For example, card members 110 are informed of their spend diagnostics (sixth and fourth data sets 234 and 230), and provide feedback (seventh and eighth data sets 236 and 238) to agents regarding whether the information is helpful, in what way, or what other information would be helpful in their spending decisions. Also, in this embodiment controller 204 is configured to update the data in the database 102 and/or lead management device 108 with seventh and eighth data sets 236 and 238, respectively.

This operation can be used to allow for benchmarking of spend diagnostics per industry, per revenue level, per card member size, etc, as discussed above. This information can then be compiled in lead management device 108, and used during subsequent communications with existing or new card members 110.

Figure 3:
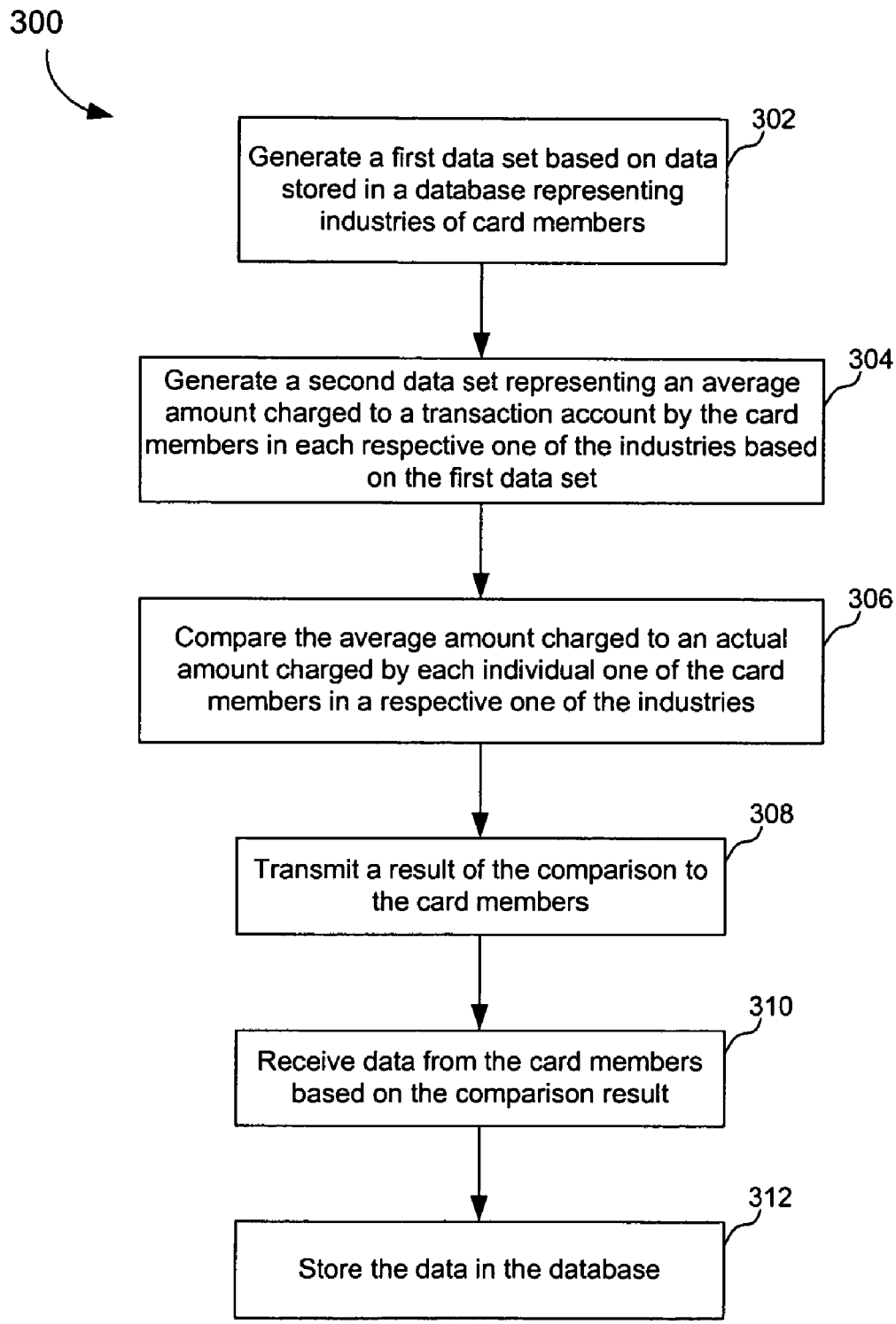
FIGS. 3, 4, and 5 show various flowcharts depicting various methods.
Figure 4:
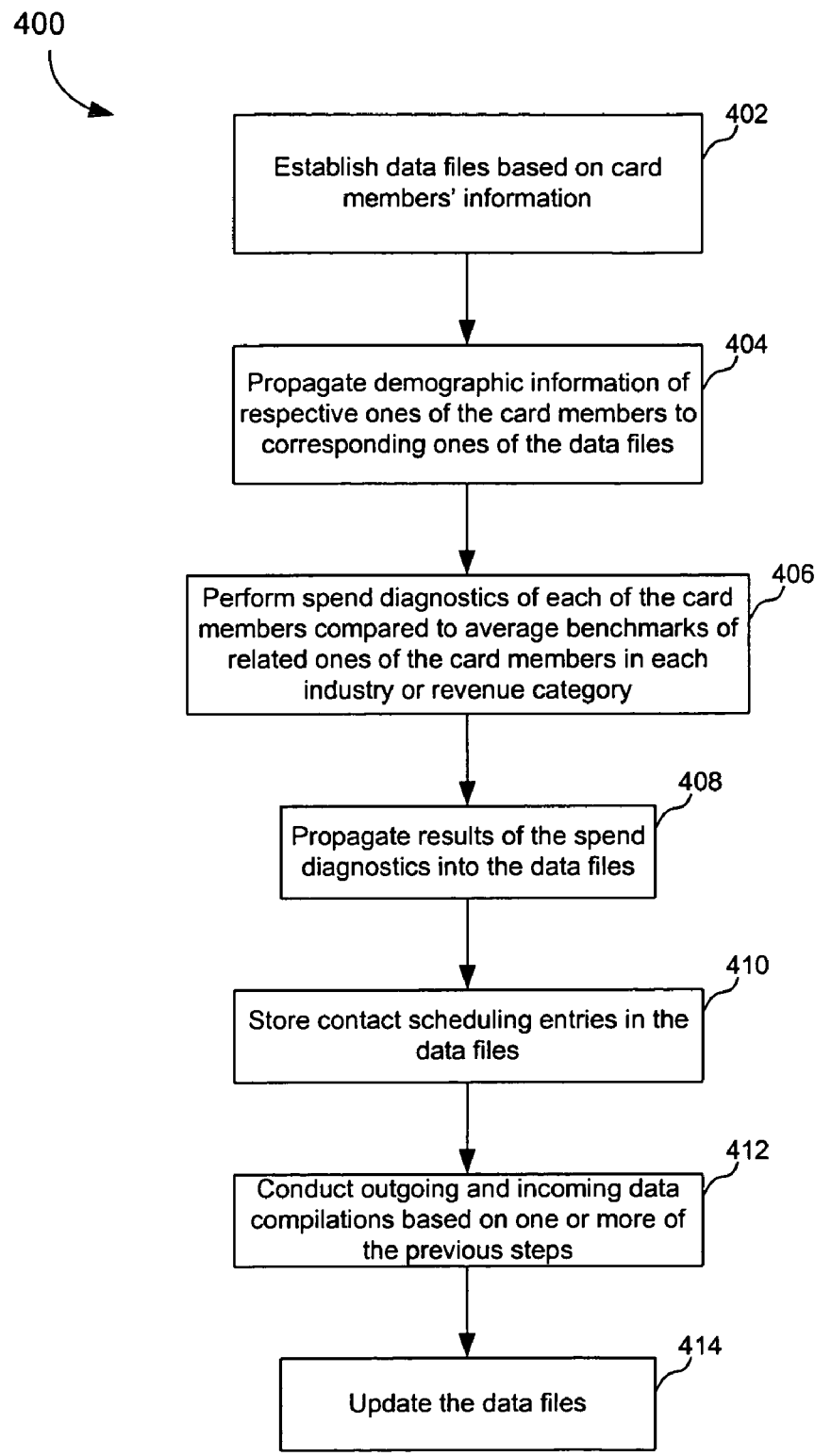
Figure 5:
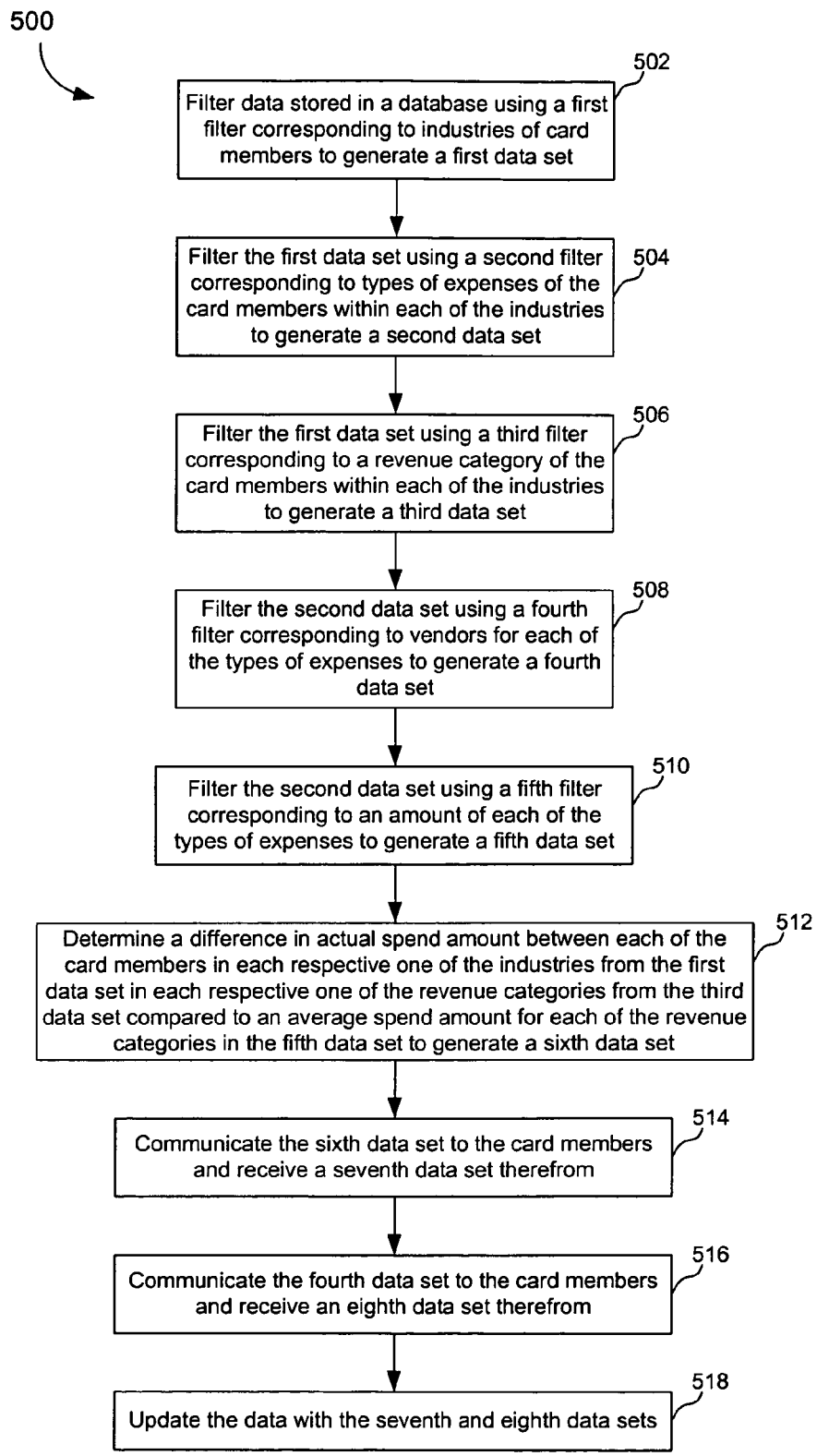

FIGS. 3, 4, and 5 show various flowcharts depicting various methods.

With reference first to FIG. 3, a flowchart is shown depicting a method 300. For example, method 300 can be performed using one or more of the systems discussed above and below. Method 300 can be a method of analyzing and updating a database or lead management device to determine and communicate unused spending power for card members. In step 302, a first data set is generated based on data stored in the database representing industries of the card members. In step 304, a second data set is generated representing an average amount charged to a transaction account by the card members in each respective one of the industries based on the first data set. In step 306, the average amount charged from step 304 is compared to an actual amount charged by each individual one of the card members in a respective one of the industries. In step 308, a result of the comparison is transmitted or communicated to the card members. In step 310, data from the card members is received. In step 312, the received data from the card members is stored in the database or lead management device, such that the database or the lead management tool is updated.

Turning now to FIG. 4, a flowchart is shown depicting a method 400. For example, method 400 can be performed using one or more of the systems discussed above and below. Method 400 can be a lead or contact management method. In step 402, data files are established based on card members' information. In step 404, demographic information regarding respective ones of the card members is propagated to corresponding ones of the data files (or populated to corresponding fields). In step 406, a spend diagnostic is performed for each of the card members compared to average benchmarks of related ones of the card members in each industry or revenue category. In step 408, results of the spend diagnostics from step 406 are propagated into the data files (or populated into corresponding fields). In step 410, contact scheduling entries are stored in the data files. In step 412, outgoing and incoming data compilations are conducted based on one or more of the previous steps. In step 414, the data files are updated based on step 412. Optionally, one or more of the previous steps are continuously or periodically repeated.

Now referring to FIG. 5, a flowchart is shown depicting a method 500. For example, method 500 can be performed using one or more of the systems discussed above and below. Method 500 can be a method of analyzing and updating a database or lead management device to determine and communicate unused spending power for card members. In step 502, data stored in the database is filtered using a first filter corresponding to industries of the card members to generate a first data set. In step 504, the first data set is filtered using a second filter corresponding to types of expenses of the card members within each of the industries to generate a second data set. In step 506, the first data set is filtered using a third filter corresponding to a revenue category of the card members within each of the industries to generate a third data set. In step 508, the second data set is filtered using a fourth filter corresponding to vendors for each of the types of expenses to generate a fourth data set. In step 510, the second data set is filtered using a fifth filter corresponding to an amount of each of the types of expenses to generate a fifth data set. In step 512, a difference in spend amount between each of the card members in each respective one of the industries from the first data set in each respective one of the revenue categories from the third data set compared to an average spend amount for each of the revenue categories in the fifth data set is determined to generate a sixth data set. In step 514, the sixth data set is communicated to the card members, from which an eighth data set is generated. In step 516, the fourth data set is communicated to the card members, from which an eighth data set is generated. In step 518, the data is updated with the seventh and eighth data sets.

Again, as noted above, the foregoing are merely examples of the spend diagnostics and/or lead management tool of the present invention. It will be apparent to persons skilled in the relevant arts that variations of the foregoing example are both possible and contemplated.

Figure 6:
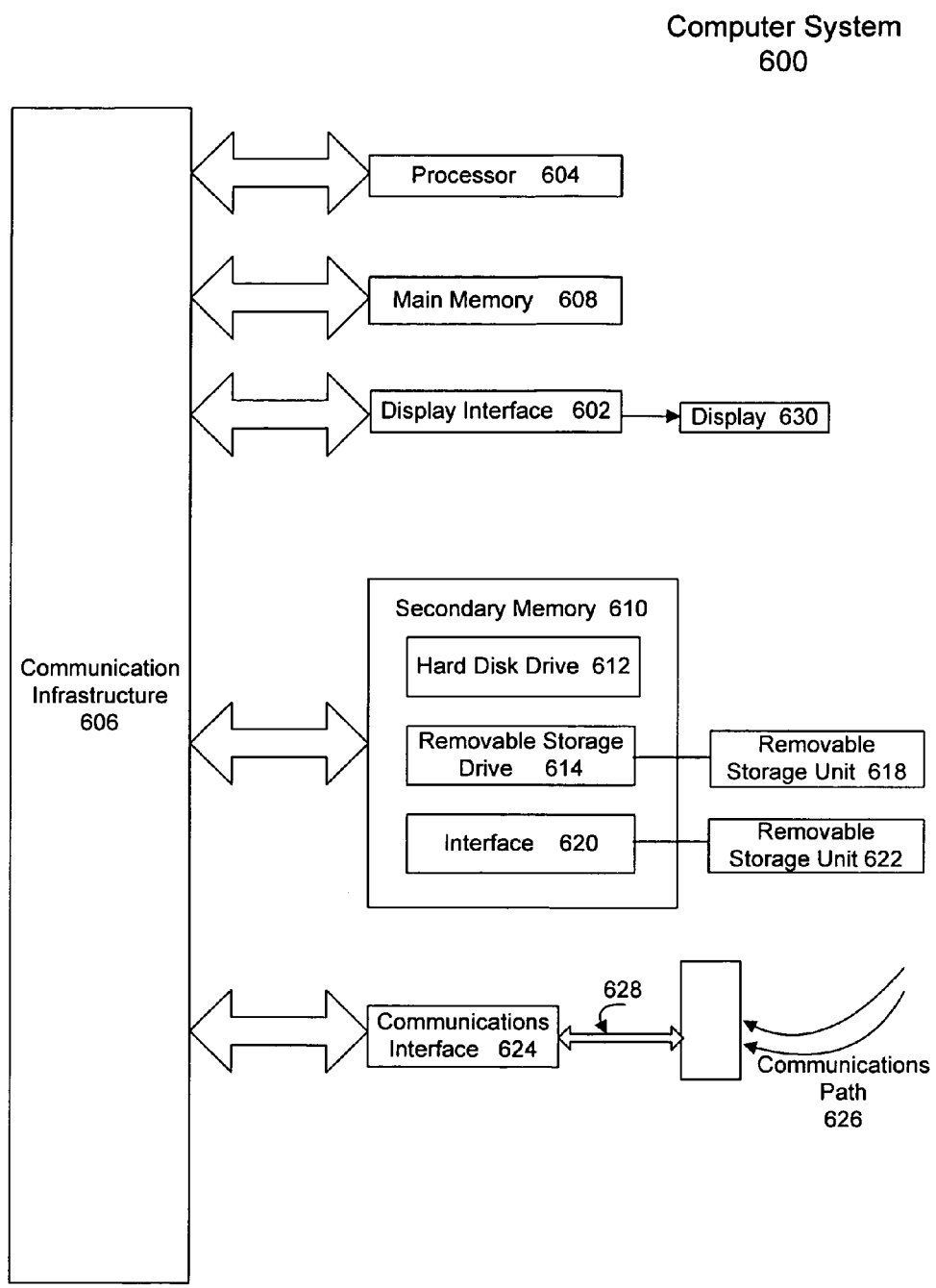
FIG. 6 is a block diagram of an exemplary computer system for use with the system and method of this invention.

In one embodiment, the invention is directed toward one or more computer systems capable of carrying out the functionality described herein. An example of a computer system 600 capable of carrying out the functions of this invention is shown in FIG. 6.

Computer system 600 includes one or more processors, such as processor 604. Processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from communication infrastructure 606 (or from a frame buffer not shown) for display on display unit 616.

Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well known manner. Removable storage unit 618 represents a floppy disk, magnetic tape, optical disk, etc., which is read by and written to by removable storage drive 614. As will be appreciated, removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable computer system 600 to perform the features of the present invention, as discussed herein. In particular, the computer programs, when executed, enable processor 604 to perform the features of the present invention. Accordingly, such computer programs represent controllers of computer system 600.

In an embodiment where the invention is implemented using software, the software may be stored in a computer program product and loaded into computer system 600 using removable storage drive 614, hard drive 612 or communications interface 624. The control logic (software), when executed by processor 604, causes processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of analyzing and updating a database or lead management device to determine and communicate unused spending power for account holders, comprising:

(a) generating a first data set based on data stored in the database representing industries of the account holders, wherein the first set of data comprises transaction data associated with a transaction account;

(b) generating a second data set representing an average amount charged to a transaction account by the account holders in each respective one of the industries based on the first data set, wherein the average is derived from no more than about 80% of the first data set;

(c) comparing the average amount charged from step (b) to an amount charged by each individual one of the account holders to a transaction account associated with each individual one of the account holders in a respective one of the industries to determine additional spend capacity or additional spend opportunity for account holders;

(d) transmitting a result of the comparison to the account holders comprising at least one of identifying additional reward program opportunities to the account holders and identifying industry preferred vendors derived from the first data set;

(e) receiving data from the account holders based on the comparison result; and (f) storing the data in the database or the lead management device.

2. The method of claim 1, wherein step (b) further comprises generating the second data set representing the average amount charged to the transaction account by the account holders in each of a plurality of predetermined revenue levels in each respective one of the industries based on the first data set.

3. The method of claim 1, wherein before step (d) further comprising: generating a third data set representing a list of vendors included in the first data set, such that the third data set is transmitted in step (d) to the account holders.

4. The method of claim 1, wherein before step (d) further comprising: generating a third data set representing types of expenses included in the first data set, such that the third data set is transmitted in step (d) to the account holders.

5. The method of claim 1, wherein step (d) comprises instant messaging, emailing, telephoning, faxing, or direct mailing the account holders.

6. The method of claim 1, wherein step (e) comprises receiving an instant message, an email, a fax, a telephone call, or mail from the account holders.

7. The method of claim 1, further comprising:
(f) repeating steps (a)-(e).

8. The method of claim 1, further comprising:
(f) inputting data regarding steps (d) and (e) into the lead management device;
(g) separating the data based on each of the account holders, each of the industries, or each of the revenue categories per industry in the lead management device; and
(h) adding demographic information from each of the account holders to the lead management device.

9. The method of claim 8, further comprising:
(i) adding contact scheduling information into the lead management device.

10. The method of claim 1, wherein step (a) comprises using Standard Industry Classification codes to represent the industries.

11. The method of claim 1, wherein the industries include professionals or construction.

12. A system for analyzing and updating a database or lead management device to determine and communicate unused spending power for account holders, comprising:
a first device configured to generate a first data set based on data stored in the database representing industries of the account holders, wherein the first set of data comprises transaction data associated with a transaction account;
a second device configured to generate a second data set representing an average amount charged to a transaction account by the account holders in each respective one of the industries based on the first data set, wherein the average is derived from no more than about 80% of the first data set;
a determining device configured to compare the average amount charged to an amount charged by each individual one of the account holders to a transaction account associated with each individual one of the account holders in a respective one of the industries to determine additional spend capacity or additional spend opportunity for account holders, wherein the determining device comprises a processor and a non-transitory memory;
a transmitter configured to transmit a result of the comparison to the account holders comprising at least one of identifying additional reward program opportunities to the account holders and identifying industry preferred vendors derived from the first data set;
a receiver configured to receive data from the account holders based on the comparison result; and
wherein the received data is stored in the database or the lead management device.

13. An article of manufacture including a non-transitory computer readable medium having instructions stored thereon that, in response to execution by a computing device, cause the computing device to perform operations comprising:
generating a first data set based on data stored in the database representing industries of the account holders, wherein the first set of data comprises transaction data associated with a transaction account;
generating a second data set representing an average amount charged to a transaction account by the account holders in each respective one of the industries based on the first data set, wherein the average is derived from no more than about 80% of the first data set;
comparing the average amount charged to an amount charged by each individual one of the account holders to a transaction account associated with each individual one of the account holders in a respective one of the industries to determine additional spend capacity or additional spend opportunity for account holders, wherein the determining device comprises a processor and a non-transitory memory;
account holders comprising at least one of identifying additional reward program opportunities to the account holders and identifying industry preferred vendors derived from the first data set;
account holders based on the comparison result; and
storing the data in the database or the lead management device.

* * * * *